(12) United States Patent
Mathie et al.

(10) Patent No.: US 10,256,485 B2
(45) Date of Patent: Apr. 9, 2019

(54) FUEL CELL PURGE LINE SYSTEM

(71) Applicant: FORD GLOBAL TECHNOLOGIES, LLC, Dearborn, MI (US)

(72) Inventors: Craig Michael Mathie, White Lake Township, MI (US); William F. Sanderson, Jr., Commerce Township, MI (US); Seha Son, Ann Arbor, MI (US); Virgo W. Edwards, Commerce Township, MI (US); Valentina Mejia Mejia, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 179 days.

(21) Appl. No.: 15/157,708

(22) Filed: May 18, 2016

(65) Prior Publication Data

US 2016/0268614 A1 Sep. 15, 2016

Related U.S. Application Data

(63) Continuation-in-part of application No. 13/793,132, filed on Mar. 11, 2013, now abandoned.

(51) Int. Cl.
*H01M 8/04082* (2016.01)
*H01M 8/04119* (2016.01)
*H01M 8/04223* (2016.01)
*H01M 8/04089* (2016.01)

(52) U.S. Cl.
CPC ... *H01M 8/04164* (2013.01); *H01M 8/04179* (2013.01); *H01M 8/04082* (2013.01); *H01M 8/04097* (2013.01); *H01M 8/04141* (2013.01); *H01M 8/04156* (2013.01); *H01M 8/04231* (2013.01)

(58) Field of Classification Search
CPC .................................................. H01M 8/04179
See application file for complete search history.

(56) References Cited

U.S. PATENT DOCUMENTS

| 6,432,568 | B1 | 8/2002 | Salvador et al. |
| 7,172,827 | B2 | 2/2007 | Scholta et al. |
| 7,931,992 | B2 | 4/2011 | Larrain et al. |
| 8,034,500 | B2 | 10/2011 | Desrosiers et al. |
| 8,216,737 | B2 | 7/2012 | Sommer et al. |
| 2001/0055707 | A1 | 12/2001 | Roberts et al. |

(Continued)

FOREIGN PATENT DOCUMENTS

| JP | 2009110840 A | * | 5/2009 |
| JP | 2010080434 A | | 4/2010 |

(Continued)

OTHER PUBLICATIONS

Katano (JP-2009110840-A)—machine translation (2009).*

*Primary Examiner* — Milton I Cano
*Assistant Examiner* — Haixia Zhang
(74) *Attorney, Agent, or Firm* — Brooks Kushman P.C.

(57) ABSTRACT

A fuel cell anode purge line includes an elongated water-scavenging body having a single inlet portion, a single outlet portion having an outlet valve, and a scavenged reservoir configured to accumulate water and fluidly connect the inlet and outlet portions so as to direct a flow of purge gas from the inlet portion through the reservoir such that the purge gas entrains the water in the flow and transfers the water towards the outlet valve.

10 Claims, 5 Drawing Sheets

(56) References Cited

U.S. PATENT DOCUMENTS

| | | |
|---|---|---|
| 2004/0072052 A1 | 4/2004 | Yamamoto et al. |
| 2005/0129992 A1 | 6/2005 | Busenbender |
| 2007/0207362 A1 | 9/2007 | Koenekamp et al. |
| 2008/0187793 A1 | 8/2008 | Owejan et al. |
| 2009/0162730 A1 | 6/2009 | Ohira et al. |
| 2010/0055523 A1 | 3/2010 | Ogawa et al. |
| 2010/0227230 A1 | 9/2010 | Goebel et al. |
| 2010/0279188 A1 | 11/2010 | Miyauchi et al. |
| 2011/0033763 A1 | 2/2011 | Adcock et al. |
| 2011/0195344 A1* | 8/2011 | Goebel ............. H01M 8/04089 429/512 |
| 2011/0207012 A1 | 8/2011 | Frost et al. |
| 2011/0236778 A1 | 9/2011 | Buchinger et al. |
| 2011/0281186 A1 | 11/2011 | Darling et al. |

FOREIGN PATENT DOCUMENTS

| | | |
|---|---|---|
| JP | 2011003447 A | 1/2011 |
| KR | 2009003585 A | 1/2009 |
| WO | 2010066462 A1 | 6/2010 |
| WO | 2013045044 A1 | 4/2013 |

* cited by examiner

FUEL CELL PURGE LINE SYSTEM

CROSS-REFERENCE TO RELATED APPLICATIONS

This application is a continuation-in-part of U.S. application Ser. No. 13/793,132 filed Mar. 11, 2013, now abandoned, the disclosure of which is hereby incorporated in its entirety by reference herein.

TECHNICAL FIELD

The present invention relates to a fuel cell purge line system.

BACKGROUND

During fuel cell operation, byproducts such as product water and nitrogen, as well as unconsumed hydrogen, may form at the anode side of a fuel cell stack. In certain known systems, accumulation of product water and nitrogen are controlled in an attempt to avoid a reduction in fuel cell performance, and/or fuel cell system shut down. One known approach is to release the water and nitrogen via a passageway downstream of the fuel cell stack. Using such an approach, the passageway is coupled with a valve for the controllable release of water and nitrogen from the fuel cell stack. This approach, however, includes the potential for problems to occur during cold weather operation of the fuel cell when water may freeze in the passageway, in the valve, or in other regions of the fuel cell with small cross sectional areas. The resulting ice formation may cause blockage of at least a portion of the passageway and prevent fluid flow (e.g., water and nitrogen removal), which may inhibit fuel cell system function.

SUMMARY

In one embodiment, a fuel cell anode purge line is disclosed. The purge line may include an elongated water-scavenging body having a single inlet portion, a single outlet portion having an outlet valve, and a scavenged reservoir. The scavenged reservoir may be configured to accumulate water and fluidly connect the inlet and outlet portions so as to direct a flow of purge gas from the inlet portion through the reservoir such that the purge gas entrains the water in the flow and transfers the water towards the outlet valve. The inlet portion may include a venturi. The venturi may increase velocity of the purge gas impacting the water in the reservoir so that the purge gas forms a jet capable of increasing a volume of water transported towards the outlet valve. The inlet portion may have a diameter $d_1$, and the venturi may include an orifice having a diameter $d_2$, wherein $d_2$ equals $\frac{1}{6}$ to $\frac{1}{2}$ $d_1$. The venturi may include a hydrophobic coating. The venturi may be located in a bottom-most section of the inlet portion directly adjacent to the scavenged reservoir. The venturi may be located no higher in the inlet portion than the jet is configured to reach. The scavenged reservoir may be cylindrical. The purge line may further include a purge gas bypass line connecting the inlet and outlet portions. The purge gas bypass line may be arranged upstream of the scavenged reservoir so that the purge gas flows from the inlet portion to the outlet valve without contacting the reservoir. The purge gas bypass line inlet may be arranged adjacent to the venturi. The diameter of the purge gas bypass line may be smaller than a diameter of the scavenged reservoir. The purge gas bypass line may include a venturi, located adjacent to a bypass line outlet, to create a low pressure region.

In another embodiment, a fuel cell anode purge gas line is disclosed. The purge gas line may include an inlet portion, an outlet portion having an outlet valve, and a scavenged reservoir. The scavenged reservoir may be configured to flow anode purge gas from the inlet portion to the outlet valve through the reservoir such that the flow physically removes any water accumulated in the reservoir. The purge gas line may further include a venturi, located in the inlet portion, designed to increase a volume of the water being removed from the scavenged reservoir towards the outlet valve. The inlet portion has a diameter $d_1$ and the venturi includes an orifice having a diameter $d_2$, wherein $d_2$ equals $\frac{1}{6}$ to $\frac{1}{2}$ $d_1$. The purge gas line may further include a purge gas bypass line directly connecting the inlet and outlet portions. The purge gas bypass line may be arranged upstream of the scavenged reservoir so that the purge gas flows from the inlet portion to the outlet valve without contacting the reservoir. The diameter of the purge gas bypass line may be smaller than a diameter of the scavenged reservoir.

In yet another embodiment, a fuel cell anode purge line water-scavenging reservoir is disclosed. The water-scavenging reservoir may include an inlet, an outlet, a top section, and a bottom section. The top section may be located above a water level and configured to direct a first portion of purge gas from the inlet through an entire length of the reservoir to the outlet valve. The bottom section may be located below the water level and configured to entrain the water in a second portion of the purge gas being directed from the inlet through the entire length of the reservoir below the water level such that the water is transferred to the outlet valve. The water-scavenging reservoir may further include a venturi, located in the inlet, to increase a volume of the water being transferred toward the outlet valve. The inlet portion may have a diameter $d_1$ and the venturi may include an orifice having a diameter $d_2$, wherein $d_2$ equals $\frac{1}{6}$ to $\frac{1}{2}$ $d_1$. The water-scavenging reservoir may further include a purge gas bypass line connecting the inlet and outlet portions. The purge gas bypass line may be arranged upstream of the water-scavenging reservoir so that the purge gas flows from the inlet to the outlet valve without contacting the reservoir.

DETAILED DESCRIPTION

Reference will now be made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

During fuel cell operation, product water, residual fuel such as hydrogen, and byproducts such as nitrogen may accumulate at the anode side of the fuel cell stack. Attempts have been made to remove the liquid product water and byproducts and to reuse the residual hydrogen and water vapor. One approach is to collect those constituents in a separator downstream of the fuel cell stack, separate liquid water, and direct the water towards a combined purging and draining passageway while returning the remaining constituents to the fuel cell stack via a return passageway. The combined purging and draining passageway is closed to the atmosphere by a single valve. Periodically, this valve is opened to drain liquid product water and purge the anode of byproducts such as nitrogen. However, combining the purging and draining functions into a single passageway closed by a single valve presents significant risk of ice formation and blockage of purge and drain flow when residual product water freezes during exposure to cold ambient temperatures. The potential for ice formation is an acute concern in cold ambient temperatures below 0° C. If the purging and draining functions are inhibited by ice blockage, then fuel cell system performance degrades, potentially to the point of system shut down.

The embodiments of the present invention, as will be described herein, provide a solution to one or more of the above-identified problems. One or more embodiments deliver a reduction in system complexity by incorporating new structures into an existing purge passageway, avoiding the use of multiple valves and passageways for startup robustness, and therefore keeping hardware and control software to a minimum. Reduction in complexity may result in a reduction in manufacturing cost, a reduction in system weight, and/or a reduction in failure mode occurrence.

In one or more embodiments, a fuel cell system with a scavenging, also called scavenged, reservoir positioned downstream of a fuel cell stack is disclosed. The scavenged reservoir may provide one or more of the following benefits: (1) a reduction and/or elimination of purging passageway blockage due to ice formation and (2) a reduction in the number of valves for purging both nitrogen and water. In certain instances, nitrogen, water, and hydrogen may flow through the same passageway employing the scavenged reservoir with a single downstream valve. This approach may be alternatively referred to as an integrated purge and drain function. This approach supports the endeavor of obtaining a commercially-viable fuel cell system design that is capable of consistently starting in freezing ambient conditions while reducing costs and improving efficiency. In addition, and as detailed herein, the product water is less of a threat for causing ice blockage during cold weather conditions.

Figure 1A:
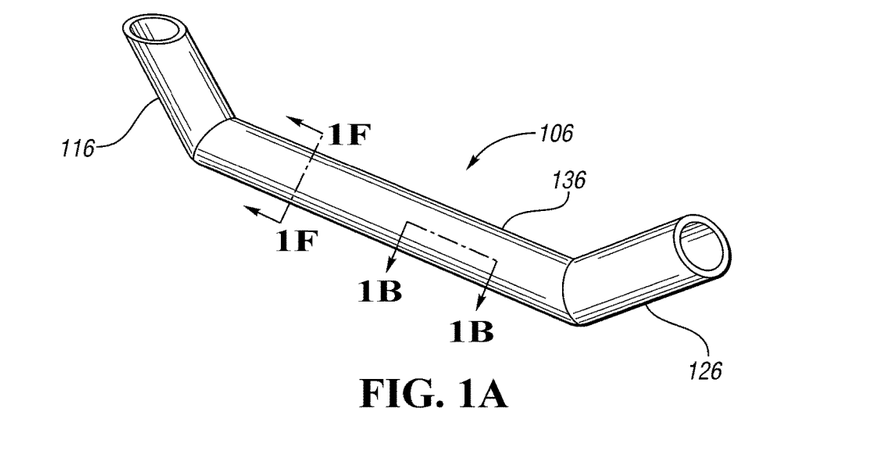
FIG. 1A depicts an isolated, perspective view of a scavenged reservoir in one or more embodiments.
Figure 1B:
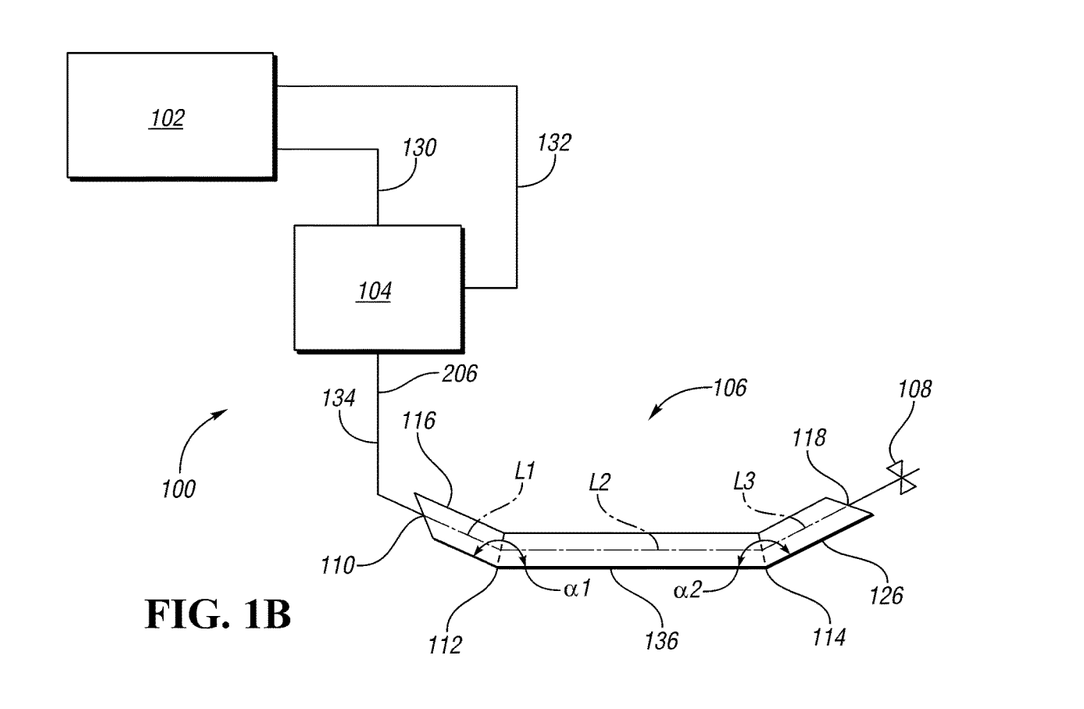
FIG. 1B depicts a schematic drawing of a fuel cell system and a cross-sectional view of the scavenged reservoir of FIG. 1A taken along line 1B-1B.

In one or more embodiments, and as depicted in FIGS. 1A and 1B, a fuel cell system generally shown at 100 in FIG. 1B may include a fuel cell stack 102, a separator 104 downstream of and in fluid communication with the fuel cell stack 102 via a passageway 130, and a scavenged reservoir 106 downstream of and in fluid communication with the separator 104, wherein the scavenged reservoir 106 includes an inlet portion 116, an outlet portion 126, and a middle portion 136 positioned between the inlet and outlet portions 116, 126. The lower surface of the inlet portion 116 is positioned with an inlet angle relative to the lower surface of the middle portion 136. The lower outlet portion 126 is positioned with an outlet angle α2 relative to the lower surface of the middle portion 136. A valve 108 is positioned downstream of the reservoir 106. As described herein, the structure of the scavenged reservoir 106 may maintain a passage extending all the way from the stack 102 to the valve 108, or at least from the separator 104 to the valve 108, and the valve 108 free of ice blockage during cold weather conditions.

During fuel cell system operation, product water, nitrogen, and residual hydrogen may flow from the fuel cell stack 102 into the separator 104 via the passage 130. In the separator 104, the product water is separated from the residual hydrogen and nitrogen. The product water exits the separator 104 through the passage 134. In certain instances, and as depicted in FIG. 1B, the separated hydrogen may be returned back to the fuel cell stack 102 via a hydrogen return passageway 132.

In one non-limiting embodiment, the scavenged reservoir 106 can be formed as a detachable unit with dimensions that comply with any fuel cell system where water freeze may be an issue. The scavenged reservoir 106 can also be incorporated into the bottom of the water knockout itself. The scavenged reservoir 106 may be an integral single unit, optionally formed via injection molding. A benefit of such configuration is that preferred liquid leakage may be reduced at the angled and tapered sections, which may otherwise require welding and/or soldering to connect. However, the inlet 116, outlet 126, and middle portions 136 can be connectable pieces with sizes and materials separately customizable for each fuel cell system. For instance, the middle portion 136 may have a cross-sectional diameter greater than, equal to, or smaller than that of either of the inlet portion 116 and the outlet portion 126. For instance also, one may choose to have a middle portion 136 formed of a material different from that of either of the inlet portion 116 and the outlet portion 126.

By reducing the total number of valves to one, which is the combined purge and drain valve 108, and by employing the scavenged reservoir 106 upstream of the valve 108, the present disclosure in one or more embodiments provides a synergistic effect of preventing ice blockage and scavenging product water.

In one or more embodiments, the term "scavenging" or "scavenged" may refer to the act of flowing the anode purge and drain gas stream over and through the accumulated liquid water to physically remove the water. The gas flow is thus used to scavenge or entrain the water in the gas flow, utilizing the gas flow to transport the water out of the system. The purge and drain gas stream may be referred to as the anode purge gas or purge gas. The purge gas may contain nitrogen, water vapor, liquid water, and residual hydrogen. The purge gas may be substantially free from hydrogen.

The scavenged reservoir 106 may be in fluid communication with an anode of the fuel cell stack 102 or a cathode of the fuel cell stack 102. When used in fluid communication with the cathode, the scavenged reservoir 106 may help prevent items such as an electronic throttle body from freezing.

The scavenged reservoir 106, and more particularly the middle portion 136 thereof, is positioned downstream from and below the separator 104 along the direction of gravity so that water can drain via gravity into the scavenged reservoir 106. Along this passageway, a valve 108 positioned downstream of the scavenged reservoir 106 should be at a position above the scavenged reservoir 106 along the direction of gravity so that any water which would otherwise reside on or around the valve 108 would then accumulate in the middle portion 136. The water should accumulate in the middle portion 136 in such a manner as to permit gas passage through the middle portion 136, even if any accumulated water forms ice. The valve 108 can be a closed solenoid valve. Any other suitable type of a valve is contemplated.

Figure 1C:
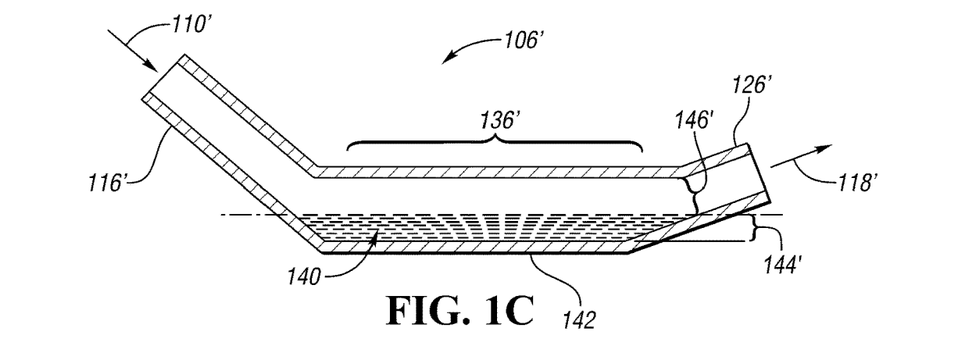
FIG. 1C depicts a longitudinal cross-sectional view of an alternative scavenged reservoir according to another embodiment.

FIG. 1C depicts a scavenged reservoir 106' showing water or ice 140, accumulated on the lower surface 142 of the middle portion 136', with a clear flow path above the water or ice accumulation. During nitrogen purging and water draining events, the flow of warm anode byproducts melts ice and entrains liquid water accumulated in the middle portion 136'. The entrained water is carried to the outlet portion 126' and towards the valve 108. In this configuration, the product water and nitrogen gas can be purged substantially evenly in the presence of ice in the passageway. This design, therefore, provides a synergistic effect in that not only the nitrogen gas and the product water can be purged via a single passageway with a single downstream valve to reduce system complexity and maintenance cost, but also provides built-in warming and melting effectuated via the fluid mixture passing through the scavenged reservoir 106'. Transition from the inlet portion 110' to the middle portion 136' is gradual.

Figure 1D:
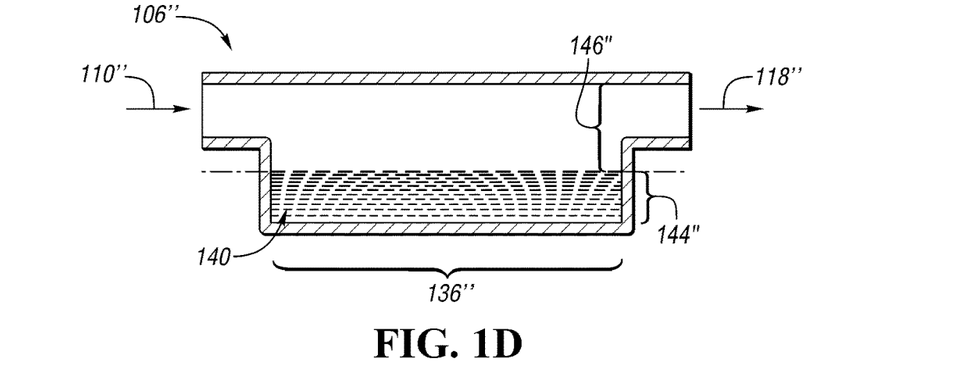
FIG. 1D depicts a longitudinal cross-sectional view of a scavenged reservoir.
Figure 1E:
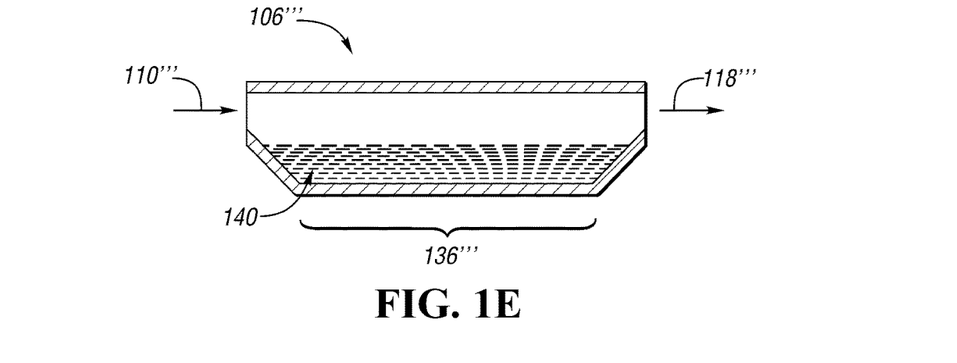
FIG. 1E depicts a longitudinal cross-sectional view of a scavenged reservoir.

FIGS. 1D and 1E depict scavenged reservoirs 106" and 106''' according to alternative embodiments of the present disclosure. Referring to FIGS. 1D and 1E, the inlet ends 110" and 110''' that transition into the reservoirs 106" or 106''' respectively may be substantially circular or nearly circular. As shown in FIG. 1D, the reservoir 106" has a nearly rectangular reservoir cross-sectional middle portion 136". The transition from the inlet end 110" into the middle portion 136" is not a gradual transition. FIG. 1E depicts the reservoir 106''' with a gradual decline transition from the inlet end 110''' into the middle portion 136'''.

Several factors can be considered in shaping the scavenged reservoir. These factors may include designing the inlet and outlet angles, the inlet, the outlet, and the reservoir cross sectional areas, and the length, width, and depth of each section of the scavenged reservoir in response to flow stream characteristics, which in themselves are a function of load as dictated by usage cycle. In general, the scavenged reservoir should be designed with dimensions effectuating sufficient storage of product water during a soak to avoid system blockage upon a subsequent start up attempt. In certain embodiments, the angles of the inlet to and outlet from the reservoir should be upward to facilitate gravity drainage of water into the reservoir for storage and freezing. Moreover, the position of the water and anode knock-out purge line installed in a vehicle should also take into consideration road pitch. For example, the angles of the inlet to and outlet from the reservoir should be great enough to overcome road pitch of ±17° to facilitate gravity drainage of water into the reservoir for storage and freezing. Those skilled in the art know that a road pitch may deviate greatly from being nearly planar to mountainous roads having steep inclines and declines which may exceed ±3°, ±5°, ±8°, ±11°, ±15°, ±18°, ±21°, and ±25°, to which the angles of the inlet to and outlet from the reservoir should be great enough to overcome.

The inlet portion, the outlet portion, and/or the middle portion can each be structured with any suitable geometrical features including ribbing and vanes, which may straighten or direct fluid flow, or even add turbulence to the fluid flow. Such manipulation of the fluid flow may enhance the scavenging effect during operation or could be used to direct water flow during non-operation prior to freezing.

In one or more embodiments, the water should accumulate entirely or significantly in the middle portion 136 in such a manner as to permit gas passage through the middle portion 136 even if any accumulated water forms ice. The amount of water present in the middle portion 136 fluctuates and defines a water level. The water level in turn defines the bottom section 144 and the top section 146 of the middle portion 136 or the reservoir 106. The water level, the bottom sections 144', 144" and the top sections 146', 146" are depicted in FIGS. 1C and 1D. The top section 146 located above the water level may remain free from water such that at least a portion of the purge gas may flow unrestricted through the entire length of the middle portion 136 or reservoir 106. The bottom section 144 is located below the water level and the at least a portion of the purge gas may flow through the water in the bottom section 144, entrain the water, and transport the entrained water towards the outlet portion 126 and the valve 108.

Referring back to FIG. 1B, the inlet portion 116 may be configured as a substantially cylindrical or cylindrical structure including a first end 110 and a second end 112, with an inlet length Ln1 measured down the centerline axis L1. In certain embodiments, the inlet length Ln1 of the inlet portion 116 has a value of about 0.5 inches to 10 inches (1.27 cm to 25.4 cm), 1.0 to 5 inches (2.54 cm to 12.7 cm), or 2.0 inches to 3.0 inches (5.08 cm to 7.62 cm). The centerline axis of the middle portion 136 is designated as L2, and the centerline axis of the outlet portion 126 is designated as L3. In certain embodiments, the combination of the centerline axes L1, L2, and L3 constitutes a longitudinal axis of the scavenged reservoir. Further, the cross-sectional views of the scavenged reservoirs 106, 106', 106", and 106'" depicted in FIGS. 1B, 1C, 1D, and 1E, respectively, may be considered latitudinal cross-sectional views.

Referring further to FIG. 1B, the inlet angle $\alpha 1$ may be an angle defined by a longitudinal cross-sectional lower surface of the inlet portion 116 and a longitudinal cross-sectional lower surface of the middle portion 136. The outlet angle $\alpha 2$ may be an angle defined by longitudinal cross-sectional lower surface of the middle portion 136 and a longitudinal cross-sectional lower surface of the outlet portion 126. The inlet angle $\alpha 1$, the outlet angle $\alpha 2$, or both may be configured to facilitate directing water into the middle portion 136 during soak events. This helps to permit ice to form in the middle portion 136 and away from passage and passageways that may be relatively more sensitive to bridging and blockage.

The inlet angle $\alpha 1$, the outlet angle $\alpha 2$, or both may be greater than about 90° and smaller than about 155.5°. In certain instances, the inlet angle $\alpha 1$, the outlet angle $\alpha 2$, or both may be between about 100° to 155.5°, 120° to 155.5°, 130 to 155.5°, or 140° to 155.5°.

This paragraph relates to the installation of the combined water and anode knock-out purge line in a fuel cell within a vehicle. The centerline axis L2 of the middle portion 136 can be positioned relative to the direction of gravity at an angle of about 65.5° to 114.5°, 70° to 110°, or 85° to 95°. The middle portion 136, as positioned in relation to the inlet portion 116 and the outlet portion 126, is to provide a platform for water to reside on a bottom surface of the middle portion 136, leaving an upper space, the top section 146, for gas flow. In certain particular instances, the middle portion 136 can be essentially positioned flat, for instance, in an angle of about 88.5° to about 91.5° relative to the direction of gravity, to collect as much water as possible.

Figure 1F:
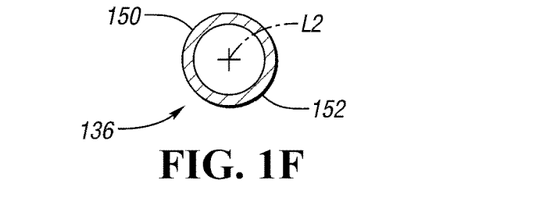
FIG. 1F depicts a cross-sectional view of the scavenged reservoir of FIG. 1A taken along line 1F-1F.

Referring to FIGS. 1B and 1F, the middle portion 136 may be configured as substantially cylindrical or a cylindrical structure including a centerline axis L2 and defined between the second end 112 and a third end 114. The cylindrical structure shown in 1F depicts a lower surface 152 and an upper surface 150. The middle portion 136 may have a length Ln2 measured down the centerline axis L2 and ending between the second and third ends 112, 114. In certain designs, the length Ln2 of the middle portion 136 has a value of 0.5 inches to 10 inches (1.27 cm to 25.4 cm), 1.0 to 5 inches (2.54 cm to 12.7 cm), or 2.0 inches to 3.0 inches (5.08 cm to 7.62 cm). In one or more embodiments, the middle portion length Ln2 is configured such that the scavenged water is not dropped out of the purge and drain flow stream and back into the reservoir before reaching the outlet portion (in this case, the middle portion would be too long).

Figures 2, 3A, 3B, 3C, 3D, 3E, 3F, 3G:
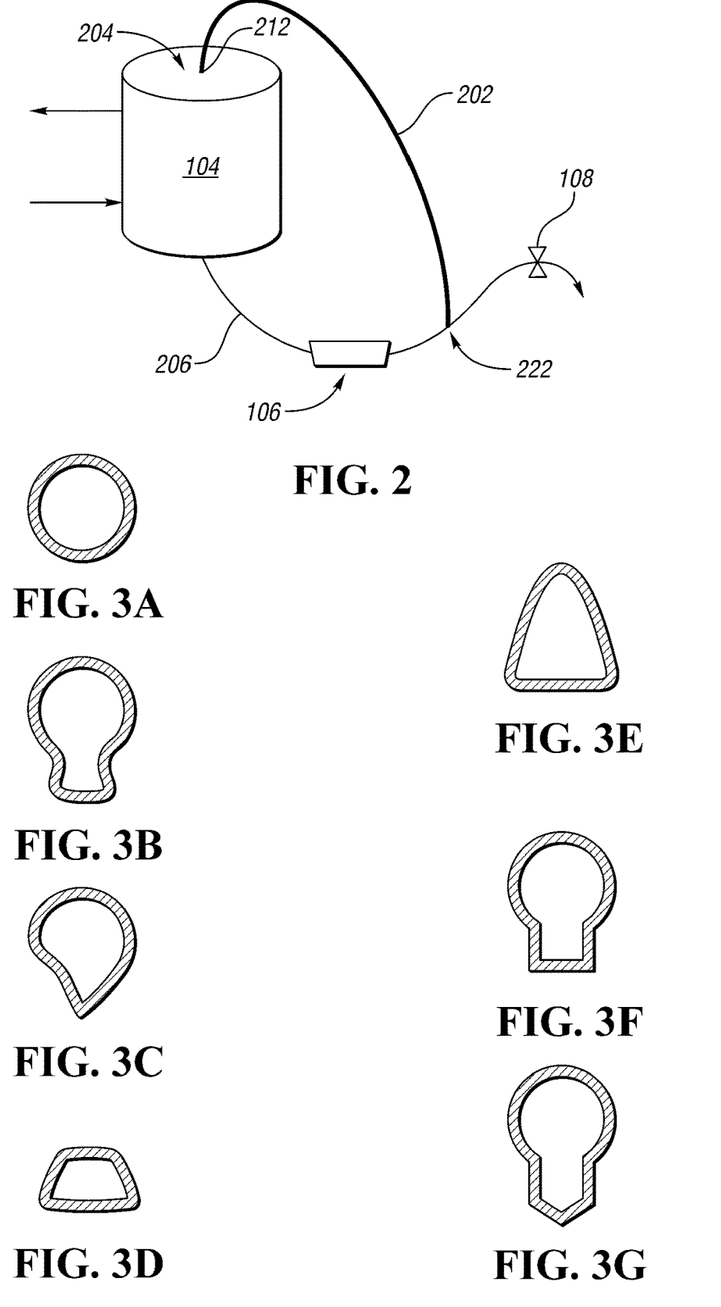
FIG. 2 depicts a variation of the fuel cell system referenced in FIG. 1B including a supplemental purge passageway.
FIGS. 3A-3G depict a number of variations of a cross-sectional view of a scavenged reservoir.

In alternative embodiments, referred to in FIGS. 3A-3G, the middle portion 136 may be configured in various shapes construed or varying longitudinal cross-sectional shapes suitable with dimensions effectuating sufficient storage of product water during a soak to avoid system blockage upon a subsequent start up attempt. FIGS. 3A-3G represent alternative embodiments in which the angles of the inlet to and outlet from the reservoir are upward to facilitate gravity drainage of water into the reservoir for storage and freezing. FIGS. 3A-3G depict a variation of cross-sectional views of the scavenged reservoir of FIG. 1A taken along the line 1F-1F, wherein FIG. 3A is circular or substantially circular, and FIGS. 3B-3G have a drainage reservoir that allows gravity drainage of water into the reservoir for storage and freezing. FIGS. 3B-3G may be turned relative to a central point fixed axis, in 15°, 30°, 45°, 60°, 75°, 90°, 105°, 120°, 135°, 150°, 165°, and 180°.

The outlet portion 126 may be configured as a substantially cylindrical or cylindrical structure including a centerline axis L3 and defined between the third end 114 and a fourth end 118. The outlet portion 126 may have a length Ln3 measured down the centerline axis L3 and ending between the third and fourth ends 114, 118. In certain designs, the length Ln3 of the outlet portion 126 has a value of 0.5 inches to 10 inches (1.27 cm to 25.4 cm), 1.0 to 5 inches (2.54 cm to 12.7 cm), or 2.0 inches to 3.0 inches (5.08 cm to 7.62 cm). Without wanting to be limited to any particular theory, the outlet portion 126 is configured such that the scavenged water is not dropped back into the reservoir before reaching the purge and drain valve. The lengths Ln1, Ln2, and Ln3 may be the same or different. In at least one embodiment, depicted in FIG. 1B, Ln2 is greater than Ln1 and Ln3.

When the inlet portion is cylindrical or substantially cylindrical, the inlet portion 116 may have an average diameter of about 5 to 20 mm, 7.5 to 17.5 mm, or 10 to 15 mm. In one or more embodiments, the inlet portion length Ln1 creates directionality to the fluid flow, imparting flow separation between the terminus of the inlet portion and the top of the middle portion and resulting in the fluid flow impacting the lowest inner surface of the middle portion. This action causes scavenging of the pool of water. In other embodiments, inlet portion 116 may be conical or frusto-conical tapered from a large base at 110 to the smaller base at 112.

The middle portion 136 may be cylindrical or substantially cylindrical, or any other suitable cross-section such as rectangular or polygonal. When the inlet portion 116 is cylindrical or substantially cylindrical, the middle portion 136 has an average diameter of about 12.5 mm to 55 mm, 13.5 mm to 40 mm, 15 mm to 30 mm, 16 mm to 25 mm, or 17.5 mm to 20 mm. The middle portion 136 may be configured to have an average diameter the same or different than that of the inlet portion 116 and/or the outlet portion 126. For example, the middle portion 136 may have a greater average diameter than that of the inlet portion 116 and/or the outlet portion 126. The difference in average diameter values can be about 2 mm to 11 mm, 3 mm to 10 mm, 4 mm to 9 mm, or 5 mm to 8 mm. These diameters may be configured such that a single droplet of water would not bridge or completely block a passageway due to capillary forces.

As depicted in FIG. 2, the fuel cell system may further include a supplemental purge passageway 202 to provide purging supplemental to that provided by the primary purge passageway 206 where the scavenged reservoir 106 resides. The supplemental purge passageway 202 may include a first end 212 and a second end 222, the first end 212 being connected to and/or received within a top portion 204 of the separator 104, the second end 222 being disposed upstream of the valve 108. In certain instances, the supplemental purge passageway 202 is connected to the primary purge passageway 206 at junction 224, wherein the second end 222 is disposed downstream of the scavenged reservoir 106 and upstream of the valve 108.

The incoming flow may include water in liquid and/or vapor states, hydrogen, and nitrogen, and the incoming flow passes through the primary and/or supplemental purge passageway in various concentrations. The extent of a flow through the supplemental purge passageway 202 can be controlled such that the supplemental purge passageway 202 may come into effect only when the primary purge passageway 206 fails to provide the requisite amount of purging as desirable. This control can be done in a variety of ways including the employment of a restriction device such as an orifice to restrict the flow through the supplemental purge passageway 202 or a valve such as a solenoid valve.

As depicted in FIG. 1B and FIG. 2, although the supplemental purge passageway 202 is separately disposed relative to the primary purge passageway 206, the supplemental purge passageway 202 may feed the same valve 108 used by the primary purge passageway 206, thereby keeping costs and parasitic losses low.

Referring back to FIG. 1B, the middle portion 136 of the scavenged reservoir 106 remains the lowest region in the primary purge passageway 206 relative to the passageway's origination from the separator 104. Referring back to FIG. 2, the middle portion 136 of the scavenged reservoir 106 remains the lowest spot in the primary purge passageway 206 relative to the second end 222 of the supplemental purge passageway 202. This relatively low region provides a region for water to accumulate away from areas that are sensitive to blockage from ice formation such as the merge location (e.g., the second end 222) of the primary and supplemental passageways, or the orifice in the valve 108.

The supplemental purge passageway 202 is provided such that it originates at a location on top of the separator 104 that permits gas flow in the presence of ice blockages in the primary passageway 206. The supplemental purge passageway 202 merges with the primary passageway 206 prior to the location upstream of the valve 108. The origination at the separator 104 may prevent accumulation of liquid water that could later freeze. The supplemental purge passageway 202 may contain an orifice (not shown) in the flow path to restrict fluid flow, ensuring that the majority of the purge and drain fluids flow through the primary passageway 206 unless the primary passageway 206 is blocked or restricted by liquid water or ice.

Therefore, the supplemental purge passageway 202 serves as a bypass loop that will enable purge flow in the event that the primary purge passageway 206 is blocked with ice until the primary purge passageway 206 is thawed and able to flow both purge and drain fluids. In this arrangement the valve 108 must be located such that it is not the lowest component in the entire system to prevent it from being subjected to ice blockage.

In certain designs, the primary passageway, the secondary passageway, or both may be formed out of a conductive material. Such primary passageway, the secondary passageway, or both may be placed wholly or partially within another system pipe that carries warm gases or fluids, such as the cathode exhaust passageway coming out of the stack or a pipe carrying warm stack outlet coolant. In this manner, the passageways will be latently warmed by their surroundings, efficiently thawing any ice using waste heat. Suitable conductive materials include, but are not limited to, metal such as copper, aluminum, composites, and the like.

Alternatively, the primary passageway, the secondary passageway, or both, or certain portions thereof may be formed from a plastic material. The plastic may be molded, for example by clam shell molding and welded together, or injection molded. It may be desirable to form the individual passageways without having to weld individual portions together, as was mentioned above. Yet, welding or adhesive joining of the molded parts is contemplated. The plastic material may be any plastic compatible with the function of the passageways. Exemplary plastics may include thermoplastics, high-purity materials and high-performance engineering plastics with excellent mechanical strength and dimensional stability such as fluoropolymers, including but not limited to, polytetrafluoroethylene (PTFE), fluorinated ethylene propylene (FEP), perfluoroalkoxy alkane (PFA), polyvinylidene fluoride (PVDF), polychlorotrifluoroethylene (PCTFE), ethylene chlorotrifluoroethylene (ECTFE), ethylene tetrafluoroethylene (ETFE), high-performance polyimides, polyamides such as nylon, the like, or a combination thereof.

At least a portion of the primary passageway, the secondary passageway, or both may include a lining increasing mechanical properties, longevity of the passageway, hydrophobicity, other properties, or a combination thereof. An exemplary lining may be formed via inclusion of a membrane such as Gore-Tex® membrane, which is a thin layer of expanded polytetrafluoroethylene (ePTFE). The lining may be included within at least a portion of the reservoir 106, covering at least a portion of the inner surfaces of the reservoir 106. Alternatively, all of the inner surfaces of the reservoir 106 may include the lining. Other portions of the system 100 such as the passage 134, passageways 130, 132, or their combination may include the lining.

Due to the purging/scavenging effect, the water is prevented from filling the reservoir 106. In other words, as purge gas enters through the inlet portion 166 and then flows through the middle portion 136, liquid water is entrained in the purge gas flow and transported to the outlet portion 126. The water removal process is conducted during system operation or whenever the valve 108 is being operated. To further enhance the scavenging effect of the system which in turn prevents the scavenged reservoir 106 from filling with water and subsequent blockage by ice when frozen, additional structures may be introduced into the system.

Figure 4A:
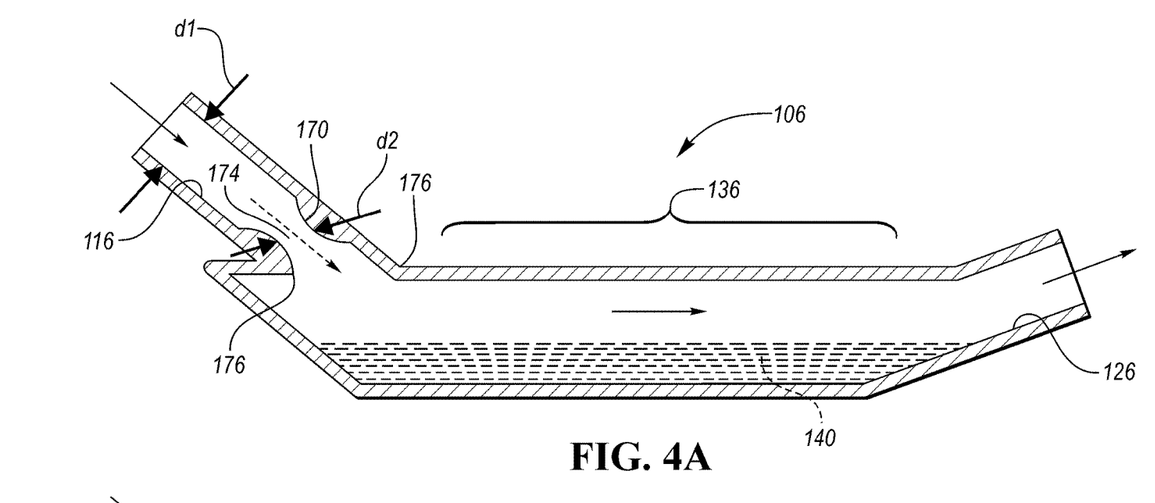
FIG. 4A depicts a longitudinal cross-sectional view of a scavenged reservoir including a venturi.

For example, a venturi may be added to the scavenged reservoir 106. An exemplary venturi 170 is depicted in FIG. 4A. The venturi 170 may be any structure capable of causing the Venturi effect, or in other words, a structure having a constricted area causing a reduction in fluid pressure when a fluid proceeds through the constricted area. For instance, the venturi may be shaped like a venturi tube having a varying diameter within its length. As such, the tube may have an inlet cone of about 30° and an exit cone of about 5°.

Figure 4B:
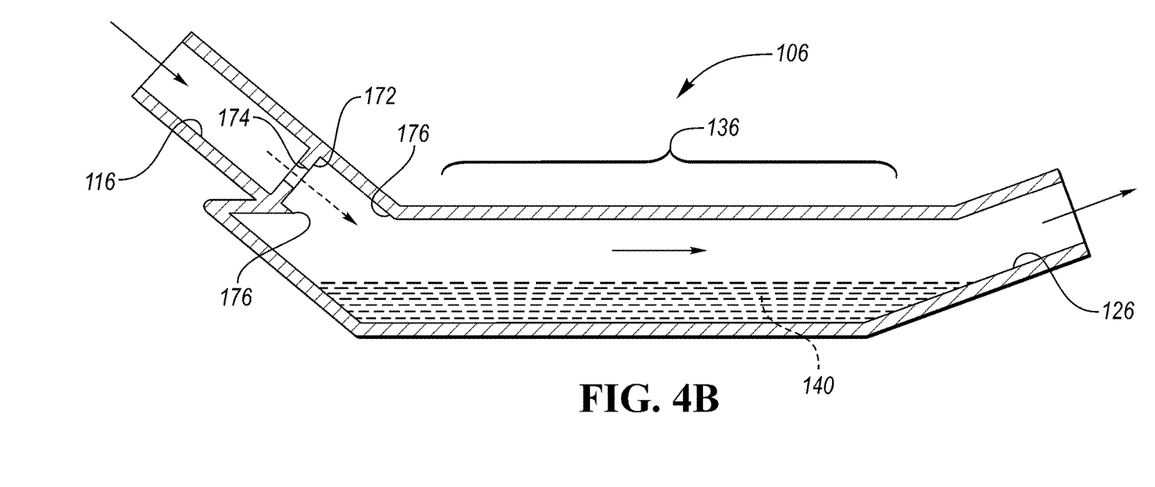
FIG. 4B depicts a longitudinal cross-sectional view of a scavenged reservoir including an orifice plate.

An alternative structure fulfilling generally the same function as the venturi 170 may be an orifice plate 172, an example of which is depicted in FIG. 4B. The orifice plate 172 may be a plate with an aperture 174 within the plate 172. The orifice plate 172 may be placed within the inlet 116. The venturi 170 or the orifice plate 172 may increase the amount of water removed with each purge pulse such that the venturi 170 or the orifice plate 172 may increase the volume of water moved towards the outlet valve 108.

Both the venturi 170 and the orifice plate 172 include an aperture or orifice 174. The orifice 174 of the venturi relates to the smallest diameter of the venturi structure. The dimensions of the orifice 174 should be tailored depending on the dimensions of the inlet portion 116, the middle portion 136, and/or dimensions of other portions and structures of the scavenged reservoir 106. The orifice size as described below is defined relative to the inlet portion size as both are governed by the power of the fuel cell system and the requisite reaction flow rates. For example, an 80 kW net fuel cell system design warrants a valve connected to the outlet of the scavenged reservoir 106 having an orifice 174 in the range of about 2 mm to 8 mm in diameter. The inlet diameter in such a system may be at least about 8 mm, depending on the desired pressure drop and maximum flow rate of the system.

The orifice 174 may be no smaller than a ratio of ⅙ of the inlet portion 116 and no larger than to ½ of the inlet portion 116. Thus, the inlet portion 116 has a diameter $d_1$ and the orifice 174 has a diameter $d_2$, wherein $d_2$ equals about ⅙ to ½ $d_1$. The orifice 174 should not be so small as to cause a single droplet condensation in the orifice 174. The condensation could block the orifice which would prevent the purge gas and water passing through the orifice 174. To assist in preventing condensation within the orifice 174, a hydrophobic material may be applied to the outer surface of the orifice 174, the venturi 170, the plate 172, or a combination thereof.

The hydrophobic material may be, for example, a superhydrophobic material which results in water sliding off of the surface. Such materials include for example manganese oxide polystyrene nano-composite, zinc oxide polystyrene nano-composite, precipitated calcium carbonate, carbon nano-tube structures, or a silica nano-coating. Alternatively, the hydrophobic material may be based on molecules of alkanes, oils, fats, or other greasy substances. The coating may be based on one or more hydrophobic polymers including acrylics, amides, imides, carbonates, dienes, esters, ethers, fluorocarbons, olefins, styrenes, vinyl acetals, vinyl esters, vinyl chlorides, vinyllidene chlorides, vinyl ethers, vinyl ketones, vinylpyridine, vinylpyrrolidone, or the like. Alternatively still, the material the orifice surface is made from may be structurally altered to provide hydrophobicity, for example, by laser-etching. Laser etching may provide ridges or other nanostructures in the material. Such laser-etched surface may provide a long-lasting water repelling effect causing the water molecules to roll off the surface. In addition, the laser-etched nanostructures may be also coated with a hydrophobic material such as polytetrafluoroethylene.

The venturi 170 or the orifice plate 172 may be installed in the scavenged reservoir 106 having cylindrical geometries, geometries depicted in FIGS. 3B-3G, or other geometries such as a toroidal scavenged reservoir. The venturi 170 or the orifice plate 172 may be located anywhere within the inlet portion 116 of the reservoir 106. The location of the venturi 170 or the plate 172 should be such that the venturi 170 or plate 172 assists in creating a jet capable of impacting the water stream in the middle portion 136. Specifically, the jet should be directed at the bottom of the middle portion 136 such that the impacted water is ejected towards the outlet valve 108. Therefore, it may be desirable to place the venturi 170 as low as possible within the inlet portion 116 relative to the middle portion 136 of the reservoir 106. Thus, the orifice 174 may be located at the bottom-most section 176 of the inlet portion 116 or adjacent to the middle portion 136. The orifice 174 may be located no higher than the point at which the jet resulting from the impact with the water in the middle portion 136 begins to contact the inlet portion 136. In other words, the venturi 170 or the plate 172 may be located no higher within the inlet portion 116 than the jet is capable of reaching.

Figure 5:
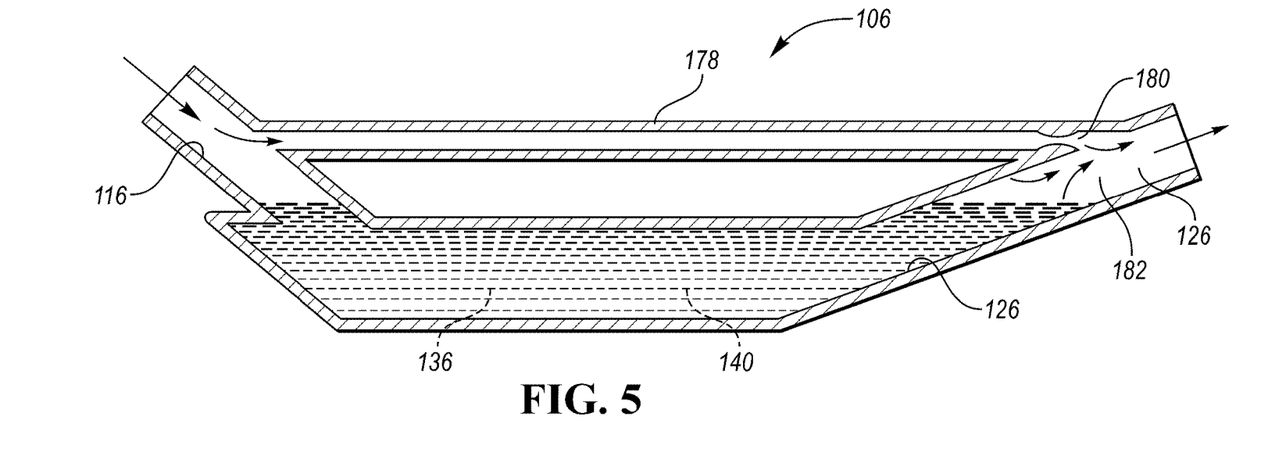
FIG. 5 illustrates a longitudinal cross-sectional view of a scavenged reservoir including a purge gas bypass line.

Another structure which may be installed in the reservoir 106 to improve its scavenging efficiency and enhance water removal in all operating conditions is a jet pump. An exemplary jet pump, also referred to as a purge gas bypass line, 178 is depicted in FIG. 5. The bypass line may be any structure directly connecting the inlet portion 116 with the outlet portion 126 and serving for the purge gas removal. The bypass line 178 enables removal of the purge gas in cases when the reservoir 106 is filled with water, ice, or both such that the purge gas is prevented from passing through the middle portion 136 of the reservoir 106. The bypass line 178 thus enables the purge gas removal during freezing start, allowing the fuel cell system operation before the ice in the reservoir 106 melts.

Additionally, the bypass line 178 has an outlet 180 which is designed to create a low pressure suction region 182 in the outlet region 126 of the reservoir 106. The low pressure region 182 assists with water removal from the middle portion 136 by pulling water towards the outlet valve 108. To create the low pressure region 182, a venturi or an orifice plate may be included in the outlet 180. The bypass line 178 may be free from the venturi 170 and the orifice plate 172.

The bypass line 178 should have a diameter which is smaller than a diameter of the inlet portion 116, the outlet portion 126, and the middle portion 136. The purpose of the bypass line 178 is to provide a backup passageway for the purge gas, especially nitrogen, which requires removal from the fuel cell system without delay. The bypass line 178 is to provide an alternative route for the purge gas primarily if the inlet portion 116, the middle portion 136, the outlet portion 126, or a combination thereof is filled with water, ice, or both such that at least one of the portions is blocked and the purge gas cannot proceed through the portions 116, 136, 126 to the valve 108. Yet, under normal circumstances when the portions 116, 136, 126 allow flow of the purge gas to the valve 108, it is desirable that the purge gas flows through the inlet portion 116 to the middle portion 136 and to the outlet portion 126 with the valve 108. Thus, the diameter of the bypass line 178 should be small enough to urge flow of the purge gas through the portions 116, 136, 126.

Figure 6:
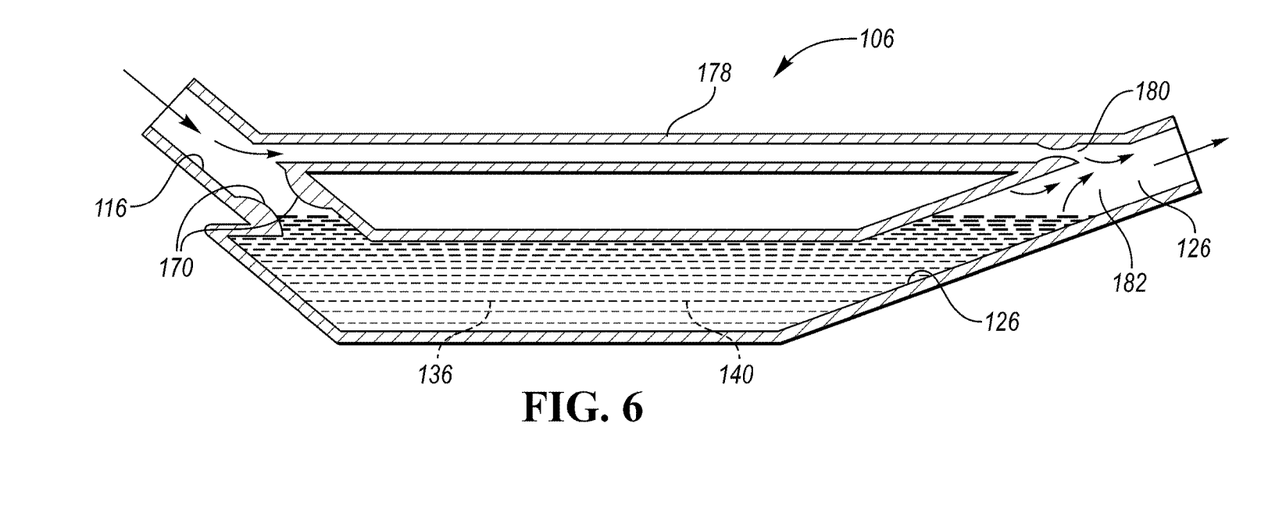
FIG. 6 shows a longitudinal cross-sectional view of a scavenged reservoir including a venturi in combination with a purge gas bypass line.

It may be desirable to provide both a venturi 170 or an orifice plate 172 in addition to the bypass line 178, as is depicted in an embodiment of FIG. 6. If a venturi 170 or the orifice plate 172 is installed in the reservoir 106, the bypass line 178 should be located upstream from and above the venturi 170 or the orifice plate 172. There is no limit as to the maximum desirable distance between the middle portion 136 and the bypass line 178; however, the further away the bypass line 178 is relative to the middle portion 136, the larger the reservoir 106 becomes. It is desirable to keep the reservoir 106 as compact as possible due to spatial arrangement of the system 100 within the vehicle.

If a venturi 170 or an orifice plate 172 is not used, the bypass line 178 may be located anywhere above the middle portion 136 of the reservoir 106. The bypass line 178 should be spaced apart from the middle portion 136 in such a distance that water does not enter the bypass line 178 if water, ice, or both fill at least one of the portions 116, 136, and 126.

In one or more embodiments, more than one bypass line 178 is contemplated. At least one additional bypass line may be located upstream of the bypass line 178 and assist in removal of the purge gas in case the middle portion 136 was filled with ice, water, or both, and the bypass line 178 was insufficient for the purge gas removal. The additional bypass line 178 may have the same or different diameter than the bypass line 178. For example, the additional bypass line 178 may have a smaller diameter than the bypass line 178 to urge the purge gas to flow through the inlet portion 116, the middle portion 136, and the outlet portion 126 to the valve 108.

In certain other designs, a heat source may be placed in close communication with the primary and secondary passageways to promote ice melt.

In certain other designs, the primary and the secondary passageways may be insulated wholly or partially to promote ice melt by prevention of heat loss.

In certain other designs, a water-vapor-permeable but water-liquid-impermeable membrane may be placed in the bypass purge passageway to keep liquid water out of the passageway to prevent ice blockage.

Having generally described several embodiments of this invention, a further understanding can be obtained by reference to certain specific examples which are provided herein for purposes of illustration only and are not intended to be limiting unless otherwise specified.

EXAMPLES

A sample scavenged reservoir is formed according to the configuration shown in FIGS. 1A and 1B. The sample scavenged reservoir as formed has the following dimensions: an inlet portion length of 63.5 mm, an inlet portion average diameter of 12.7 mm, $\alpha 1$ of 147°, a middle portion length of 54.0 mm, a middle portion average diameter of 19.1 mm, $\alpha 2$ of 155.5°, an outlet portion length of 41.3 mm, and an outlet portion average diameter of 12.7 mm.

A prototype supplemental purge passageway built according to FIG. 2 demonstrates acceptable purging performance during cold soaks, maintaining an open purge flow path without the need for multiple valves, for the next freeze start.

While the best mode for carrying out the invention has been described in detail, those familiar with the art to which this invention relates will recognize various alternative designs and embodiments for practicing the invention as defined by the following claims.

What is claimed is:

1. A fuel cell anode purge line comprising:
an elongated water-scavenging body having a single cylindrical inlet portion, a single outlet portion having an outlet valve, and a cylindrical scavenged reservoir configured to accumulate water and fluidly connect the inlet and outlet portions so as to direct a flow of purge gas from the inlet portion through the reservoir such that the purge gas transfers the water towards the outlet valve, wherein the inlet portion includes a venturi extending from an internal wall of the inlet portion to define a discontinuous surface and to increase velocity of the purge gas impacting the water in the reservoir so that the purge gas forms a jet capable of increasing a volume of water transported towards the outlet valve.

2. The purge line of claim 1, wherein the inlet portion has a diameter $d_1$ and the venturi includes an orifice having a diameter $d_2$, wherein $d_2$ equals ⅙ to ½ $d_1$.

3. The purge line of claim 1, wherein the venturi includes a hydrophobic coating on an exposed surface of the venturi.

4. The purge line of claim 1, wherein the venturi is located in a bottom-most section of the inlet portion directly adjacent to the scavenged reservoir.

5. The purge line of claim 1, wherein the venturi is located no higher in the inlet portion than the jet is configured to reach.

6. The purge line of claim 1, further comprising a purge gas bypass line connecting the inlet and outlet portions, the purge gas bypass line arranged upstream of the scavenged reservoir so that the purge gas flows from the inlet portion to the outlet valve without contacting the reservoir.

7. The purge line of claim 1, wherein a purge gas bypass line inlet is arranged adjacent to the venturi.

8. The purge line of claim 6, wherein a diameter of the purge gas bypass line is smaller than a diameter of the scavenged reservoir.

9. The purge line of claim 8, wherein the purge gas bypass line includes a venturi, located adjacent to a bypass line outlet, to create a low pressure region.

10. The purge line of claim 1, wherein centerline axes of both the cylindrical inlet portion and the outlet portion define obtuse angles with a centerline axis of the cylindrical scavenged reservoir.

* * * * *